US005226145A

United States Patent [19]

Moronaga et al.

[11] Patent Number: 5,226,145
[45] Date of Patent: Jul. 6, 1993

[54] STORAGE MANAGEMENT SYSTEM FOR MEMORY CARD USING MEMORY ALLOCATION TABLE

[75] Inventors: Kenji Moronaga; Mikio Watanabe, both of Tokyo, Japan

[73] Assignee: Fuji Photo Film Co., Ltd., Kanagawa, Japan

[21] Appl. No.: 622,033

[22] Filed: Dec. 4, 1990

[30] Foreign Application Priority Data

Dec. 8, 1989 [JP] Japan .................................. 1-317796
Mar. 14, 1990 [JP] Japan .................................. 2-60927

[51] Int. Cl.⁵ .............................................. G06F 12/00
[52] U.S. Cl. .................................. 395/425; 364/DIG. 1;
364/254.4; 364/260; 358/310; 358/335;
358/209
[58] Field of Search .......................... 395/425, 400;
364/200 MS File, 900 MS File; 371/49.1, 51.1,
50.1

[56] References Cited

U.S. PATENT DOCUMENTS

| 4,527,273 | 7/1985 | Hibi et al. | 371/51.1 |
|---|---|---|---|
| 4,660,202 | 4/1987 | Woodsum | 371/50.1 |
| 4,692,893 | 9/1987 | Casper | 371/51.1 |
| 4,799,222 | 1/1989 | Barlow et al. | 371/51.1 |
| 4,837,767 | 6/1989 | Hartwell et al. | 371/51.1 |
| 5,027,214 | 6/1991 | Fujimori | 358/209 |
| 5,032,927 | 7/1991 | Watanabe et al. | 358/335 |
| 5,068,744 | 11/1991 | Ito | 358/310 |
| 5,091,787 | 2/1992 | Watanabe et al. | 358/209 |
| 5,093,731 | 3/1992 | Watanabe et al. | 358/335 |
| 5,130,813 | 7/1992 | Oie et al. | 358/335 |
| 5,138,503 | 8/1992 | Nishida | 360/35.1 |

FOREIGN PATENT DOCUMENTS 63-286077 11/1988 Japan .
2193236 7/1990 Japan .

Primary Examiner—Joseph L. Dixon
Assistant Examiner—Frank J. Asta
Attorney, Agent, or Firm—Sughrue, Mion, Zinn, Macpeak & Seas

[57] ABSTRACT

A storage management system for a memory card, which has a storage area divided into a plurality of storage units that have a predetermined storage capacity, manages storage of information on a storage unit basis. The storage area includes a MAT for indicating a relationship of ones of the storage units in which a group of mutually associated information is to be stored in the form of a packet, and directory for indicating one of the storage units in which a beginning portion of the packet is to be stored. Stored in one of the storage units is, as a header, management data representative of at least either one of the number of occupied ones of the storage units and the number of idle ones thereof, the header including an error check code for use in detecting an error of the management data.

5 Claims, 13 Drawing Sheets

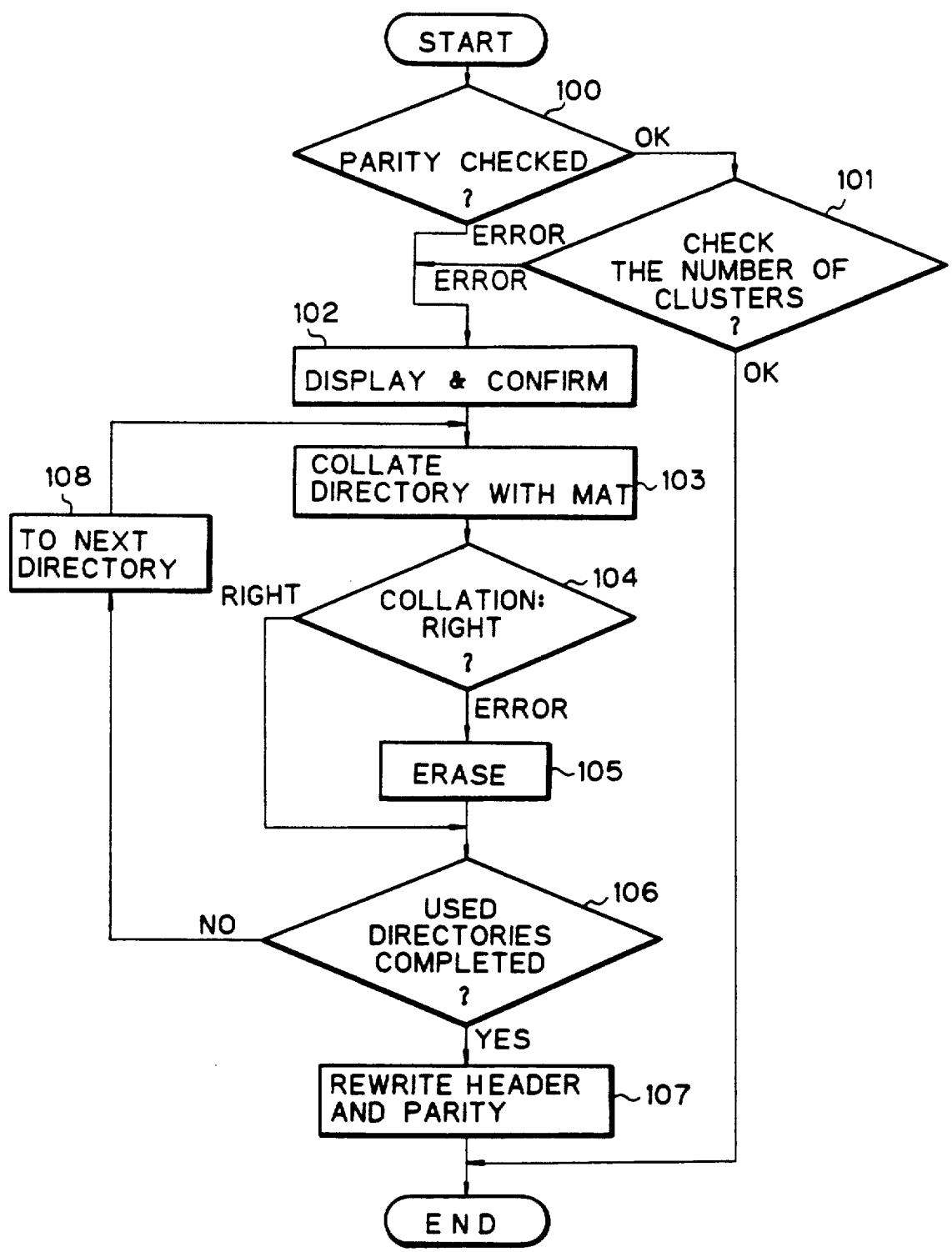

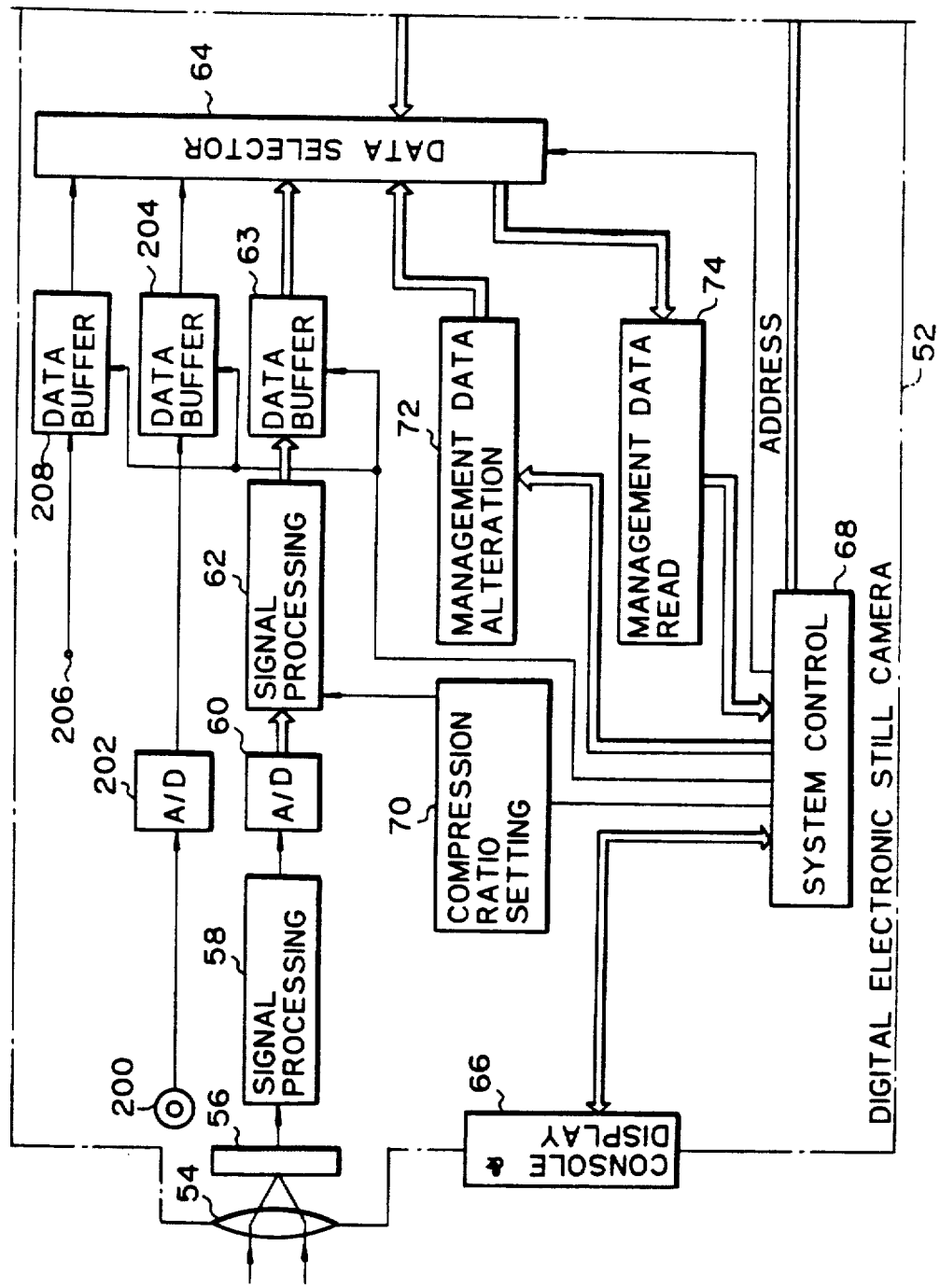

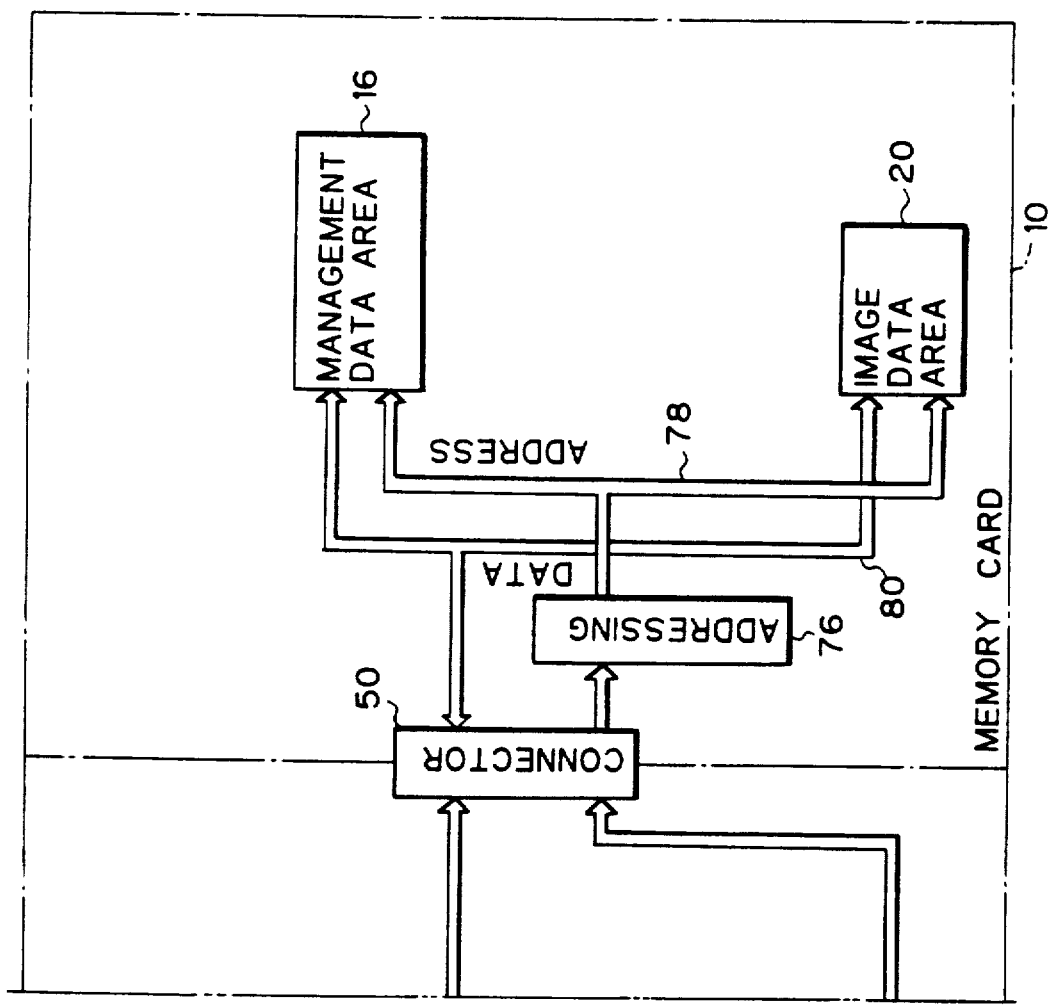

STORAGE MANAGEMENT SYSTEM FOR MEMORY CARD USING MEMORY ALLOCATION TABLE

BACKGROUND OF THE INVENTION

1. Field of the Invention

The present invention relates to a storage management system for a memory card, wherein data such as image data are stored in a memory card in the form of a file, for example.

2. Description of the Prior Art

In the field of electronic still cameras, for example, a system for storing in a memory card data representative of an image captured together with management data representative of the order of storage and indication of an occupied storage area is proposed by a co-pending Japanese patent laid-open publication, No. 286077/1988, filed in the name of the same applicant as of the present application. The image data recording system thus proposed is capable of optionally erasing individual picture images and also capable of exchanging or rearranging the sequence of the picture images. In this system, however, the storage capacity of each storage area for image data is fixed. Consequently, it has been a defect of this system that the management of storage areas in terms of efficiently storing a plurality of picture images of different size is complicated.

Also, in a co-pending Japanese patent laid-open publication, No. 193236/1990, filed in the name of the same applicant as of the present application, there is proposed a memory management system capable of efficiently storing data of variable size. According to the prior art, in the memory management system, for a memory card having a storage area divided into a plurality of clusters, for managing the storage of information on each cluster, the relationship of ones of a plurality of clusters in an image field of information is stored is indicated on a memory allocation table (MAT) a cluster in which the beginning portion of the image field of information is stored is indicated on a directory.

In the prior art, the storage areas of the memory card are managed in two different kinds of storage management areas. Consequently, when such unusual operation as unloading of a memory card from a camera during recording operation is carried out, for example, logical inconsistency may occur in the management information between the two kinds of management areas. This logical inconsistency may, when subsequently using the card, cause clusters to be permanently unusable for writing data in and reading data out of those clusters. In other words, when chained information between a MAT and a directory is broken for some reasons, clusters included in the chained information will not be usable thereafter. The similar situation will occur in a case where the logical inconsistency or errors are included in the data itself on the management areas.

Further, writing of the data into the memory card is sequentially performed. Consequently, in such a situation that one block information such as an image field of information must be stored on a distribution basis in a plurality of clusters which are scattered on the storage areas of the memory card, a time required for the storage would be increased. In addition, in a case where a random access scheme is employed, the control would be complicated and thus the system would be subjected to a large load.

The term "memory card" used in this specification means not only a storage medium which has a semiconductor storage device supported by a card type of base material and is detachably connected to other equipment but also a storage medium which is detachably connected to other equipment, such as a memory cartridge and the like having a semiconductor storage device sealed in a mold package and detachably connected to other equipment.

SUMMARY OF THE INVENTION

It is therefore an object of the present invention to provide a storage management system for a memory card capable of efficiently coping with logical inconsistency which would occur on data between storage management areas, so as to store the information in a short period of time.

In accordance with the present invention, in a storage management system for a memory card, having a storage area divided into a plurality of storage units that have a predetermined storage capacity, of managing storage of information in the plurality of storage units, a MAT indicates a relationship of ones of the plurality of storage units in which a group of mutually associated information is to be stored in the form of a packet, and a directory indicates one of the plurality of storage units in which a beginning portion of said packet is to be stored. Stored in one of the plurality of storage units is, as a header, management data representative of at least either one of the number of occupied ones of the plurality of storage units and the number of idle ones thereof, the header including an error check code for use in detecting an error of the management data.

More specifically, according to the present invention, there is provided a storage management system for a memory card, wherein the group of mutually associated information is subjected to a coded compression processing, the one of the plurality of storage units in which a beginning portion of said packet is to be stored includes information associated with a scheme of the coded compression, and logical matching between the information associated with a scheme of the coded compression and the management data is checked.

Further, in accordance with the present invention, in a storage management system for a memory card, having a storage area divided into a plurality of storage units that have a predetermined storage capacity, of managing storage of information in each of the plurality of storage units, a MAT indicates a relationship of ones of the plurality of storage units in which a group of mutually associated information is to be stored in the form of a packet, and a directory indicates one of the plurality of storage units in which a beginning portion of said packet is to be stored. In such a storage management system, at least one of the plurality of storage units is provided with a first storage area which stores packet attribute data including indication as to whether said packet is empty or occupied, and retrieval of the packet is performed referring to the first storage area.

More specifically, according to the present invention, there is provided a storage management system for a memory card, wherein the group of mutually associated information provides a first packet including image data representative of a frame of image, at least one of audio data and digital data associated with the image data provides a second packet as another group of mutually associated information, and one of the plurality of storage units is provided with a second storage area which stores identification information specifying the second packet corresponding to the first packet, and the first and second packets are read out in association with each other referring to the second storage area.

Further more, in accordance with the present invention, in a storage management system for a memory card, having a storage area divided into a plurality of storage units that have a predetermined storage capacity, of managing storage of information in each of the plurality of storage units, a MAT indicates a relationship of ones of the plurality of storage units in which a group of mutually associated information is to be stored in the form of a packet, and a directory indicates one of the plurality of storage units in which a beginning portion of said packet is to be stored. In such a storage management system, stored in one of the plurality of storage units is, as a header, management data representative of at least either one of a packet number given by the largest number of one of the packets stored in the plurality of storage units and a packet number given by the smallest number of one of the empty packets, and a storage unit number given by the largest number of the plurality of storage units and a storage unit number given by the smallest number of one of the empty storage units.

Still further more, in accordance with the present invention, a storing apparatus for storing information in a memory card having a storage area divided into a plurality of storage units that have a predetermined storage capacity comprises card connector means for connecting said memory card to said apparatus, management data forming means for forming management data including a MAT indicating a relationship of ones of the plurality of storage units in which a group of mutually associated information is stored in the form of a packet, directory indicating ones of the plurality of storage units in which a beginning portion of the packet, and either one of the number of ones of the plurality of storage units which are occupied and the number of ones of the plurality of storage units which are empty, and control means for controlling the management data forming means to store the group of mutually associated information. In such an apparatus, the control means controls the management data forming means, after completion of storage of information into the memory card, so as to first form the MAT and the directory, and then the management data to store those in one of the plurality of storage units.

BRIEF DESCRIPTION OF THE DRAWINGS

The objects and features of the present invention will become more apparent from the consideration of the following detailed description taken in conjunction with the accompanying drawings in which:

FIG. 6 is a flow chart exemplarily showing a checking operation of management data in the digital electronic still camera shown in FIGS. 5A and 5B;

FIGS. 14A and 14B are, when combined as shown in FIG. 14, schematic block diagrams exemplarily showing another application of the present invention to a digital electronic still camera.

DESCRIPTION OF THE PREFERRED EMBODIMENTS

Referring to the accompanying drawings, further details of the embodiments of a storage management system for a memory card will be given herein after.

Figure 1:
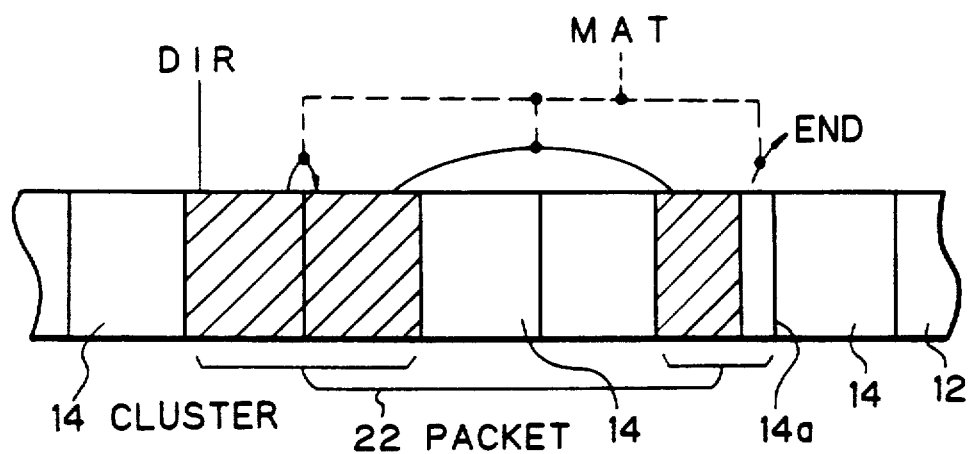
FIG. 1 is a conceptual view visualizing a concept of a storage management system for a memory card according to the present invention.
Figure 2:
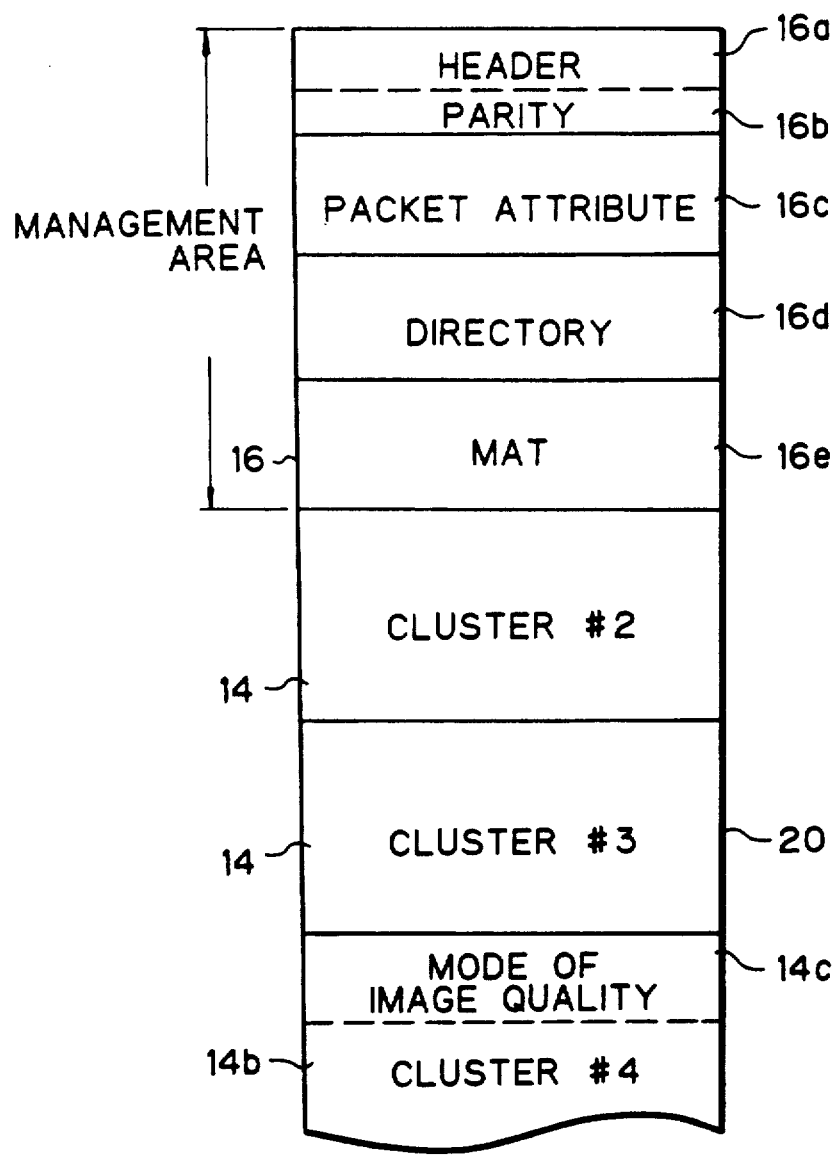
FIG. 2 is a view showing an example of a map of storage areas of the memory card in an illustrative embodiment of the present invention.

FIG. 1 conceptionally shows an illustrative embodiment of a storage management system. As shown in the figure, a memory card 10, FIG. 5B, has a storage area 12 splitted into clusters 14 having a predetermined storage capacity and is provided with management data areas 16, FIG. 5B, for storing management data. The remainder of the storage area 12 according to the illustrative embodiment is used as image data areas 20 in which image data are stored. The storage capacity of the cluster 14 may be optionally determined. For example, the capacity may be of a size enough to store a fraction of a positive integer for image data, which is necessary to represent a picture image in the form of a standard video signal format, and called "a packet". The packet may be interpreted to be a data unit including an audio data related to the image data. In the management data area 16, as shown in FIG. 2, there are stored a header 16a, a packet attribute 16c, directory (DIR) 16d and a memory allocation table (MAT) 16e.

In the illustrative embodiment, basically, a single packet of image data 22 is stored in an optional cluster 14. Stored in the MAT area 16e are data, that is, MAT data, indicating the relationship of the clusters 14 which have stored the single packet of image data. The MAT data, for example, in conjunction with the cluster 14, in which a part of the single packet of image data 22 is stored, includes identification information, such as numerical figures, pointing out another cluster in which stored is another part of the remainder of the image data 22, which is directly associated with the former part of the image data 22. When there is no remainder of the image data 22, the MAT data indicates with a predetermined code "ALL 1" (a binary value), for example, that represents that cluster 14 is the last one in the packet 22. More in detail, in MAT area 16e, there are stored the numerical figures of the subsequent cluster 14, using two bytes on each cluster. According to this embodiment, when the cluster 14 includes no image data, for instance, in an unused state or an erased state, the value of MAT 16e is given with "ALL 0", and when the MAT 16e is the end of packet 22, the value of MAT 16e is given with a predetermined code, such as "ALL 1", that is, hexadecimal "FFFF". Further, in a case where there is other cluster 14 following the packet 22, the value of MAT 16e is given with a value indicating the numerical figure of such a subsequent cluster 14.

Stored in the directory area 16d is information indicating a start cluster and a data assortment. The start cluster information is identification information, such as a start cluster No., indicating the cluster 14 which has stored the first portion of the image data on a unit image basis, that is, on each packet 22. Thus, in which cluster 14 an image field of data has been is specified. The information indicating a data assortment indicates an assortment of information stored in the memory card 10, for example, image data, audio data, character data, program and so on.

In an application of the memory card 10 having the storage capacity of 64M bits, 1024 pieces of the clusters 14 each having the capacity of 64K bits can be established. The respective clusters 14 are provided with numbers #0 to #1023 in the sequence of physical arrangement. Stored in the clusters #0 and #1 are management data. The management data, in the illustrative embodiment as shown in FIG. 2, includes header 16a, packet attribute 16c, directory 16d and MAT 16e that are stored in the respective sub-areas. Stored in the remaining clusters #1 to #1023 are image data for example that also include header information particular to individual images.

A single packet 22 is stored in one or more clusters 14. Consequently, it can also be said that a packet is a logical area in which stored image data representative of an image field. Given to the packets 22 are numerical figures in the practical sequence, for example, in the sequence of storing image data, etc. When some pocket 22 is erased, the number given to that packet becomes a space, which will later on be alloted to new image data to be stored in that packet thereafter. A packet of the image data 22 is stored in a single cluster 14 or a plurality of clusters 14. In the last cluster 14, there sometimes happens to exist a space area 14a, FIG. 1. The number of packets 22 that can be stored in the memory card 10 is equal to the number obtained by subtracting 2 from the total number of the clusters 14 in the memory card 10.

In the directory 16d, the number of the first cluster 14 on each packet 22 is stored. In the illustrative embodiment, as there are 1024 clusters, 10 bits are used for the start cluster numbers and other bits are left unused. Unused directory is indicated as "ALL 0".

Figure 3:
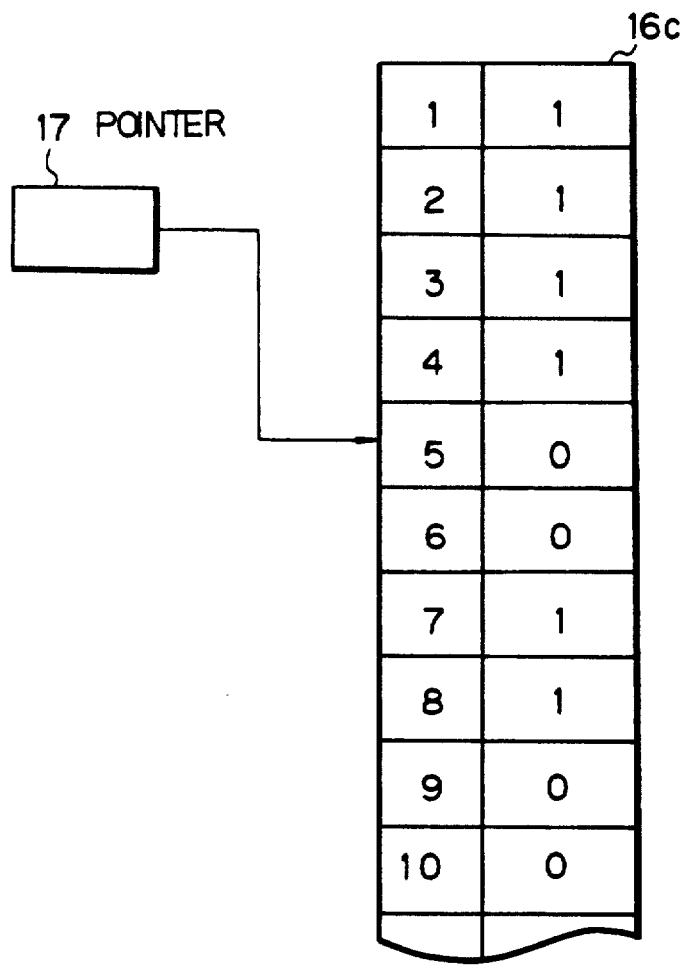
FIGS. 3 and 4 are diagrams for explanation which exemplarily show formats of a packet attribute in the example of construction of the storage areas shown in FIG. 2.

Further, according to the present illustrative embodiment, the management data area 16 is provided with a packet attribute area 16c. The packet attribute 16c includes information indicating, on each packet 22, as to whether it is used or not, and in addition, may include indication concerning, for example, yes or no of writing over, yes or no of copy and yes or no of reading out. More in detail, the packet attribute area 16c may be provided, as shown in FIG. 3, by a bit map scheme in which one bit per a packet is allocated in an indication, and each of the bits indicates whether or not the associated packet 22 has been occupied. In the illustrative embodiment, binary "1" indicates the state of the packet 22 being occupied, while binary "0" indicates the state of the packet 22 being empty. A bit map pointer 17 indicates a specific packet position on the bit map.

Figure 4:
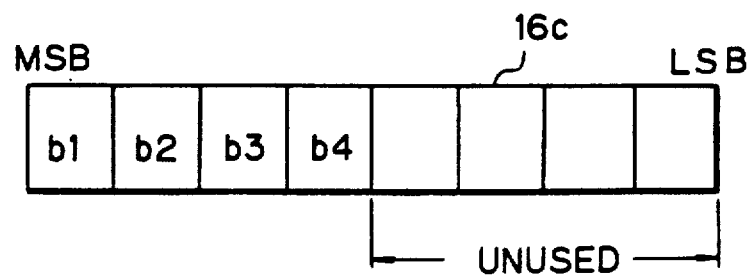

FIG. 4 shows an example of the packet attribute 16c in which a single packet 22 comprises one byte of which 4 bits are used for indication of the packet attribute. The first bit b1 of the most significant bit MSB indicates yes or no of writing over, writing protection being represented by "1", and allowance of writing over being represented by "0". In this case, it may be interpreted that the writing over includes erasing. The second bit b2 indicates empty or occupation of packet 22, "1" representing occupation, "0" representing empty. The third bit b3 indicates yes or no of copying of information stored in the memory card, a copy inhibition being represented by "1", a copy allowance being represented by "0". Similarly, the forth bit b4 indicates yes or no of reading out of information stored in the memory card, reading out inhibition being represented by "1", reading out allowance being represented by "0". For instance, regarding a packet which became unusable on storage area 20, the indication "11X1XXXX" is indicated as the packet attribute 16c, where "X" is a bit representing "don't care".

As explained above, according to the illustrative embodiment, there is provided such a treatment that the attribute among the management data related to the packet 22, particularly, one related to the occupation-/empty is independent of the directory 16d. This makes it possible to retrieve the packet attribute area 16c independently of directory 16d, and thus, as will be described in detail after, possible to perform simply and promptly retrieval of the packet 22, in a memory card 10 which employs such a system that address of the storage area and data are transferred on a serial basis.

Stored in the header 16a are the number of occupied clusters, the number of remaining clusters, a maximum active packet number, first free packet number and parity 16b. The number of occupied clusters is data representative of total numbers of the clusters 14 in which image data are effectively written on the storage area 20. The number of remaining clusters is data representative of the number of clusters 14 which are available for writing of the image data on the storage area 20, that is, the number of empty clusters 14. There is sometimes a memory card 10 of which ROM area, not shown, stores data representative of a storage capacity of the storage area. In case of such a card, the number of occupied clusters and/or the number of remaining clusters are available for check, upon comparison of their numbers with the storage capacity, of retionality thereof.

The maximum active packet number of the header 16a is data representative of a packet having the largest packet number among the packets 22 stored in the storage area 20. In this case, while there sometimes happens to exist erased one among a series of active packets, the largest packet number becomes the maximum active packet number. When the memory card 10 is mounted on a regenerative apparatus to read out the image data 20 on the card, the regenerative apparatus loads thereinto, as will be explained later, the packet attribute 16c and directory 16d. In such a case, referring to the maximum active packet number makes it possible to grasp the amount of use of those, and thus possible to restrict the loading area. The first free packet number indicates youngest number among the free packets on the storage area 20. The first free packet number can be written, for example, when the image data are reproduced by the regenerative apparatus. This makes it possible, when the memory card 10 is mounted on the electronic still camera to perform an image recording, to reduce a processing load of the camera.

A header 16a may include a maximum active cluster number and a first free cluster number in addition to or instead of the maximum active packet number and the first free packet number. The maximum active cluster number is data representative of a cluster having the largest cluster number among the clusters 14 stored in the storage area 20. In this case also, while there sometimes happens to exist empty one among a series of active clusters, the largest cluster number becomes the maximum active cluster number. The first free cluster number indicates youngest number among the free clusters on the storage area 20. The maximum active cluster number and the first free cluster number may provide the similar effects as discussed on the maximum active packet number and the first free packet number.

The header 16a includes a parity area 16b and be provided with one byte as a storage area designated with one address. The parity is obtained by means of calculation of the parity located in an address direction of bits associated with the respective digits all over the byte of the header 16a, that is, in a vertical direction, and is stored in a memory location of the final address of the header data area 16a. This calculation is realized by means of performing addition on each digit on a binary basis and deleting carry. Thus, it is possible to check normality of data contents of the header data area 16a. While the present illustrative embodiment utilizes the parity check, it is possible to emply a checking code system capable of correcting errors, for example, CRC code, etc.

Header 16a may include, in addition to the parity area 16b, a user area for storing user data, for example, a card number, a name and so on, with which a user can provide the memory card. Further, the header 16a may include format version data for identification indication which indicates assortment of the card 10, for example, such that the card is for an image. The format version data is utilized, in a case where memory cards other than a predetermined kind of cards 10 are connected to a recording apparatus and a regenerative apparatus, for example, in such a case that a memory card for use in data processing is mounted on an electronic still camera, for protection of those apparatuses and cards.

By the way, as exemplarily shown in cluster #4 in FIG. 2, data 14c indicating an image quality mode is stored in a first cluster of some packet 22. The image quality mode 14c indicates a mode of an encoding compression of image and/or audio data for forming the packet 22. For example, the image data varies a packet of total data quantity in accordance with a standard mode, and the encoding compression mode such as a high density compression mode having a compression ratio, one bit per pel for example, and thus varies the required number of clusters capable of storing a packet of compressed image data. According to the present illustrative embodiment, when the image data 20 is stored in the memory card 10 in a recording apparatus such as an electronic camera, the image quality mode 14c is written into a first cluster 14b of the packet. This makes it possible for a regenerative apparatus, when regenerated, to identify the number of clusters 14 to be accessed.

Figure 5A:
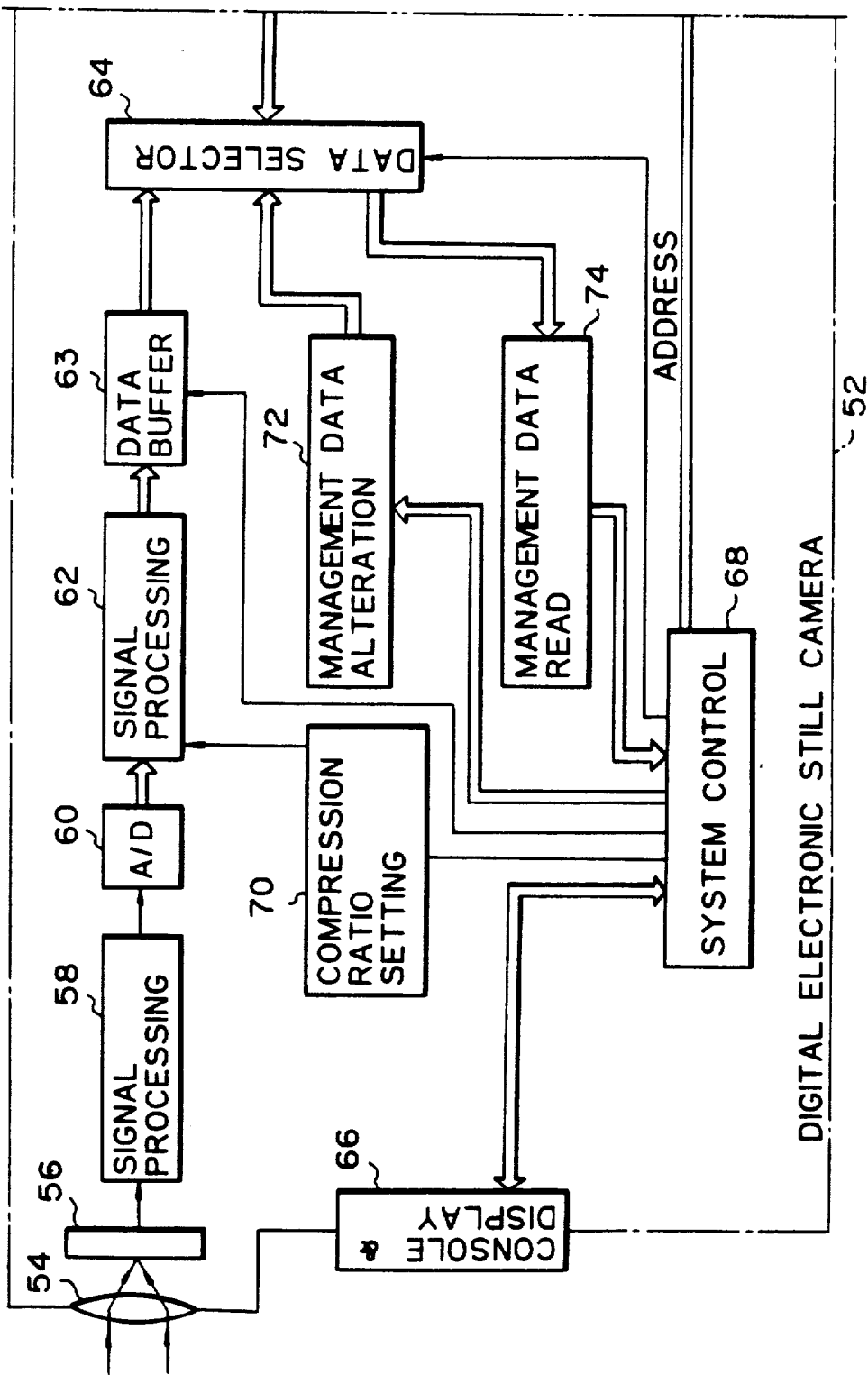
FIGS. 5A and 5B are, when combined as shown in FIG. 5, schematic block diagrams exemplarily showing an application of the present invention to a digital electronic still camera.
Figure 5B:
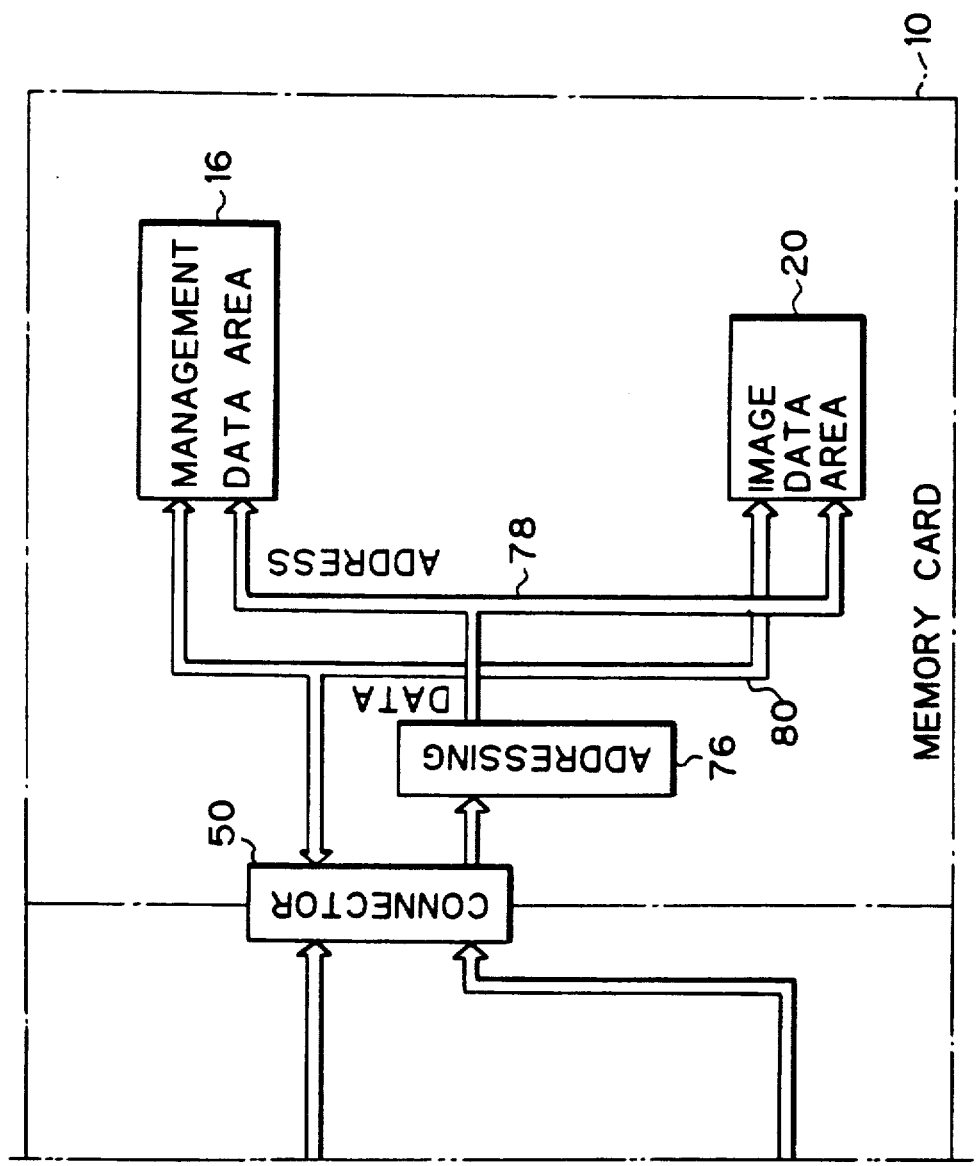

FIGS. 5A and 5B show an illustrative embodiment wherein such a storage management system as mentioned above is applied to a digital electronic still camera. In the illustrative embodiment, the storage management system comprises a digital electronic still camera 52 being detachably connected to a memory cartridge 10 through a connector 50. The camera 52 is a still picture photographing device which photographs a scene by an image picking-up device 56 through an optical lens system 54 to store the image data representative of the field in a memory card 10. The picking-up device 56 produces an output, which is in turn subjected to signal processing, such as color regulation, in a signal processing circuit 58 and converted into the corresponding digital data through an analog-to-digital (A/D) converter circuit 60. Those digital data are processed with color separation and compression encoding in a signal processing circuit 62 and then transmitted to the connector 50 through a data selector 64.

The camera 52 has a console and display 66, which receives various manual instructions such an exposure, data compression mode and write protect designations, and also indicates the state of the system to the user, such as alarm indicative of the state in which any idle cluster is not available to storing a record of image data. Console and display 66 generates data representing the designations fed therein to a system control 68. The information on the state of the camera 52 is fed to the console and display 66 from the system control 68.

The system control 68 is a control unit which not only controls the entire operations of the camera 52 but also writes data in the memory card 10. Connected to the system control 68 is a compression ratio setting circuit 70 which is a circuit for setting a compression ratio of codes for image data to a signal processing circuit 62 in accordance with a data compression mode indicated by the console and display 66 under the control of the system control 68. As the compression coding method, an orthogonal transform such as a two-dimensional cosine transform, or the sub-sampling, and the quantization are advantageously applicable.

The data selector 64 is a selector circuit which sends out image data from the signal processing circuit 62 and control data involved in the system control 68 selectively through the connector 50 to the memory card 10. Connected to the data selector 64 are a management data alteration circuit 72 and a management data read-out circuit 74. The management data alteration circuit 72 is a circuit which generates data to be written in the management area 16 of the memory card 10. The management data read-out circuit 74 reads out management data stored in management data area 16 of the memory card 10 and then feeds those to the system control 68.

The memory card 10 has an addressing circuit 76 to which an address specifying a storage location in the memory card 10 is given from the system control 68 through the connector 50. The memory card 10 has an address bus 78 and a data bus 80 for storage data areas 16 and 20. The former is connected to the addressing circuit 76 and the latter to the connector 50.

In an operational condition, when the memory card 10 is connected through the connector 50 to the camera 52, the system control 68 causes the management data read-out circuit 74 to read out the header 16a stored in management data area 16 of the memory card 10. More in detail, an address of an area of the header 16a is designated by addressing circuit 76 through address bus 78, so that the header 16a is read out by the management data read-out circuit 74 through the connector 50 and the data selector 64.

The system control 68 first checks a format version included in the thus read out header 16a. According to the present illustrative embodiment, if such a format version has no indication for image, the console display 66 displays such an indication that the associated memory card is to be excluded. Further, if it includes a card number of a user, it also be displayed. Next, as shown in FIG. 6, there is performed a parity check on the header 16a. A result of the parity check is compared with the parity 16b (step 100). This parity check is, as aforementioned, achieved by means of performing addition on each digit on a binary basis in an address direction of bits associated with the respective digits all over the byte of the header 16a and deleting carry.

If a result of the parity check is preferable, the system control 68 carries out check 101 as to the number of clusters. This check is to calculate a total number of clusters in the storage area from a card capacity read through the memory card 10 and check as to whether the total number of clusters is equal to a sum of the number of occupied clusters and the number of remaining clusters. The number of occupied clusters and the number of remaining clusters are the management data included in the header 16a. This will be described in detail after referring to FIG. 7. If it is successful in the check 101, the system control 68 causes the console display 66 to display "ready to capture".

The system control 68 controls, in response to an operation of a capturing button of the console and display 66, the image picking-up device 56 so as to photograph a scene. The picking-up device 56 produces an output, which is in turn subjected to signal processing, such as color regulation, in signal processing circuit 58 and converted into the corresponding digital data through analog-to-digital (A/D) conversion circuit 60. Those digital data are processed with color separation in signal processing circuit 62 and compression encoding in a compression ratio set by compression ratio setting circuit 70 and then transmitted to the memory card 10 through data buffer 63, data selector 64 and connector 50.

At that time, the system control 68 reads MAT data 16e from the management data area 16, and searches a cluster given with the empty indication "all 0". The number of clusters necessary for storage of one packet 22 is calculated by the system control 68 based on the compression ratio designated by the compression ratio setting circuit 70. Thus, the system control 68 generates an address for designating a first storage location of the required clusters 14, and transmits the same to the card 10. In the card 10, the addressing circuit 76 generates on the address bus 78 a storage location address in each cluster 14, so that the image data on the data bus 80 is written into the image data area 20. At that time, data representative of the image quality mode 14c according to the compression ratio is written into the first cluster 14b, FIG. 2.

Thus, when a packet 22 of image data and, if required, the associated audio data have been stored in the storage area 20, the system control 68 controls management data alteration circuit 72 to renew MAT 16e. That is, in order to provide a continuity of the clusters 14 used in recording of a packet 22 of image data, described in MAT 16e are the associated successive cluster numbers corresponding to the clusters 14, respectively, and "all 1" is described in the last cluster. The management data alteration circuit 72 transfers the thus renewed MAT data 16e to card 10, and such a data is written into the management data area 16.

Similarly, the directory 16d is also renewed. Alteration of the directory 16d is performed on data assortment and a start cluster. The start cluster is a first cluster number of a series of clusters used in recording of a packet 22 of data. This is formed in the management data alteration circuit 72 and be stored in the management data area 16 of the card 10.

The system control 68 next renews the packet attribute 16c, that is, sets the attribute indication on the packet 22 stored in the card 10. According to the bit map scheme shown in FIG. 3, there is provided an occupied state indication "1" for the packet attribute bit of the stored packet 22. According to the scheme shown in FIG. 4, a bit b2 indicating an empty state or an occupied state of the packet 22 is set to an occupied state indication "1" to the packet attribute bit of the stored packet 22. Further, there are set a bit b1 indicating yes or no of writing over, a bit b3 indicating yes or no of copy, and a bit b4 indicating yes or no of reading out, in accordance with a state set on the console display 66. Those data are also transferred to the management data area 16 of the card 10.

Finally, the system control 68 performs rewriting of header 16a. An addition of the number of occupied clusters is carried out in accordance with the number of clusters required for storage of a packet 22 of data, while a subtraction of the number of remaining clusters is carried out, so that the first free packet number is renewed. If there is change in the maximum active packet number, this is to be renewed. It is similar also on the first free cluster number and the maximum active cluster number. There is formed the parity located in an address direction of bits associated with the respective digits on the whole data of the thus renewed header 16a as a result, that is, in a vertical direction, and as a result the parity 16b is renewed. The renewed header 16a is written into the management data area 16.

As explained above, in storage of the image data into the memory card 10, written into the card 10 is the image data 20, MAT 16e, directory 16d, packet attribute 16c and header 16a in the order named. The reason why this is so performed is that even if there happens such a matter that the card 10 is pulled out from the connector 50 in mid course of these serious operations, recording and regeneration operations for the successive card 10 are effectively performed.

Now returning to FIG. 6, the system control 68, upon detection of an error in the parity check 100 or the clusters check 101, causes the console display 66 to display such a matter (102), and then shifts the step to the next step 103 and thereafter concerning error processings. In step 103, the directory 16d provided with no "unused" indication is compared with MAT 16e to check a logical matching therebetween. In other words, it is checked as to whether there is formed an adequate chain between the directory 16d provided with indication of the start cluster number and the associated MAT 16e. If the collation is right (104), the procedure goes to step 106 in which an error processing is performed on the used directory 16d. Such an error processing is performed on all of the used directories 16d (108). If there is an error in the collation in step 104, the associated packet or cluster is erased (105). According to this erasing, MAT 16e is given with "unused" indication "all 0", and the associated packet attribute 16c is given with "empty" indication "0". In example shown in FIG. 4, the second bit b2 is given with "0".

When the error processing has been completed on all of the used directories 16d (106), the system control 68 performs rewriting of header 16a in accordance with a result of the processing. This rewriting is performed in such a way that the number of occupied clusters and the number of remaining clusters are calculated over again, the maximum active packet number and the first free packet number are modified, if changed, and the management data area 16 of the card 10 is renewed.

Figure 7:
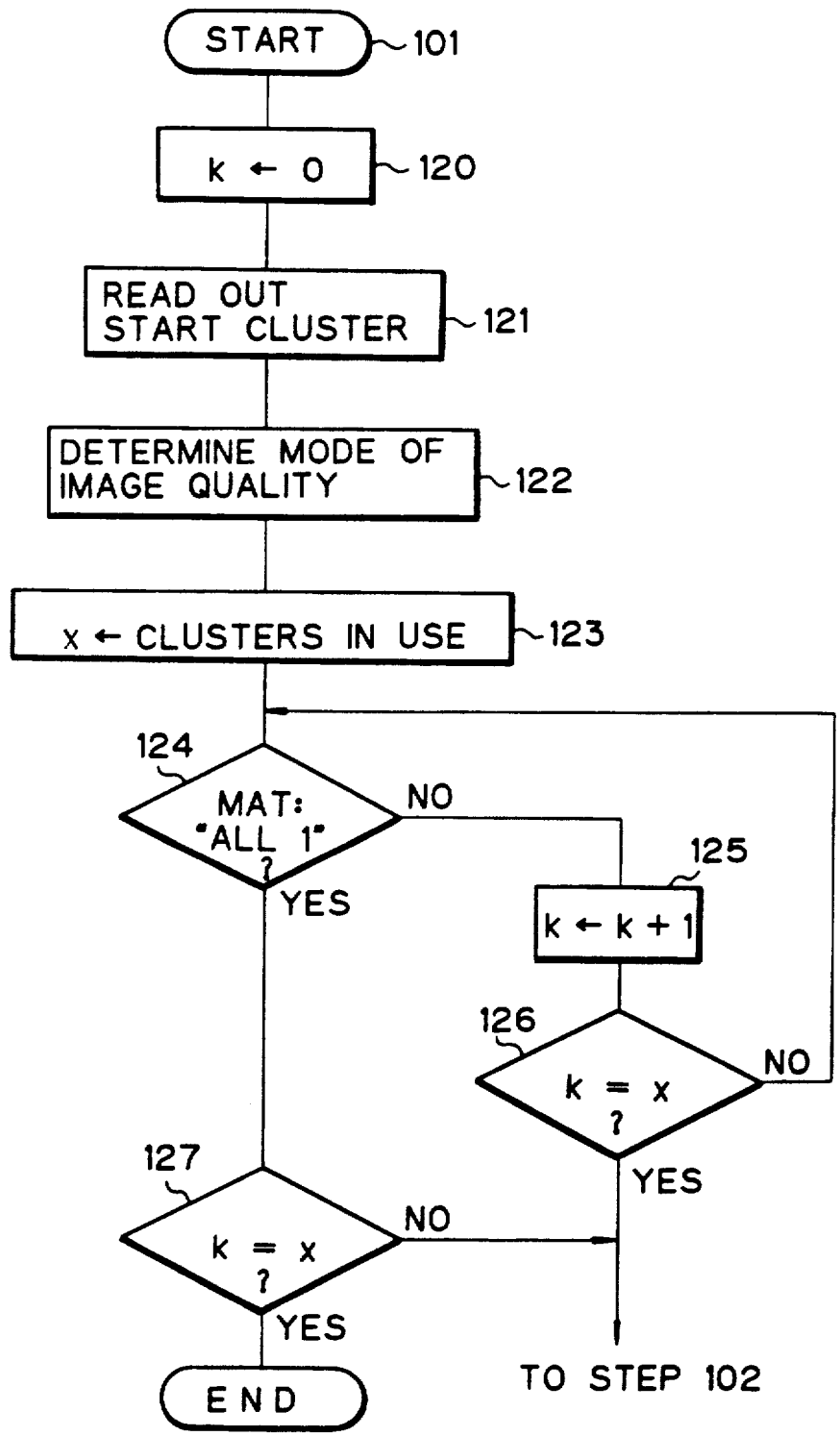
FIG. 7 is a flow chart exemplarily showing a check routine of the number of clusters in the flow shown in FIGS. 5A and 5B.

Clusters check routine 101 is exemplarily shown in FIG. 7. The system control 68 first set parameter k to "0" (120). Next, the start cluster number is read out from the directory 16d (121) and the image quality mode data 14c stored in the cluster 14 is read out. Thus, the image quality mode is identified (122), so that the number of clusters used in the packet can be grasped. The thus obtained value is set to parameter x (123).

Now, there are retrieved MATs 16e forming a chain from the start cluster number indicated by the directory 16d to search a MAT given with final MAT indication "all 1", incrementing parameter k (124–126). If the final MAT indication "all 1" can not be located although following up the final number x of the occupied clusters in the chain of clusters 14, it means that there exists an error, and thus the procedure goes to the display step 102. In step 124, on the other hand, if the final MAT indication "all 1" is detected in MAT 16e, and at that time the parameter k indicates the final number x of the occupied clusters, then it means that this cluster chain is right. Thus, clusters check routine 101 is terminated.

The memory card 10, in which the image data are thus stored, can be regenerated by a regenerating apparatus in the following procedure. When the memory card 10 is connected to the regenerative apparatus to designate a frame number to be regenerated, the regenerative apparatus reads out the management data area 16 of the card 10 to generate an address for a cluster in which data of an image field to be reproduced from the directory 16d and the MAT 16e is stored. At that time, there are known sizes of the packet attribute area 16c and the directory area 16d referring to the maximum active packet number included in header 16a, so that the search ranges of both the areas are restricted to read the packet attribute data and the directory. Such a restriction of the search areas causes a processing speed of the regenerative apparatus to increase. According to the regenerative apparatus, it is possible to know a youngest number of free packet through this search, and thus also to renew a first free packet number of the header 16a. In an image data storage apparatus such as a camera, referring to such a first free packet number reduces a load of the processing in the storage.

Image data is read out from the image data area 20 in accordance with the generated cluster address. The compressed code of the image data thus read out is expanded, converted into a format for a television signal, and reproduced to be a visible image on a monitor.

Figure 8:
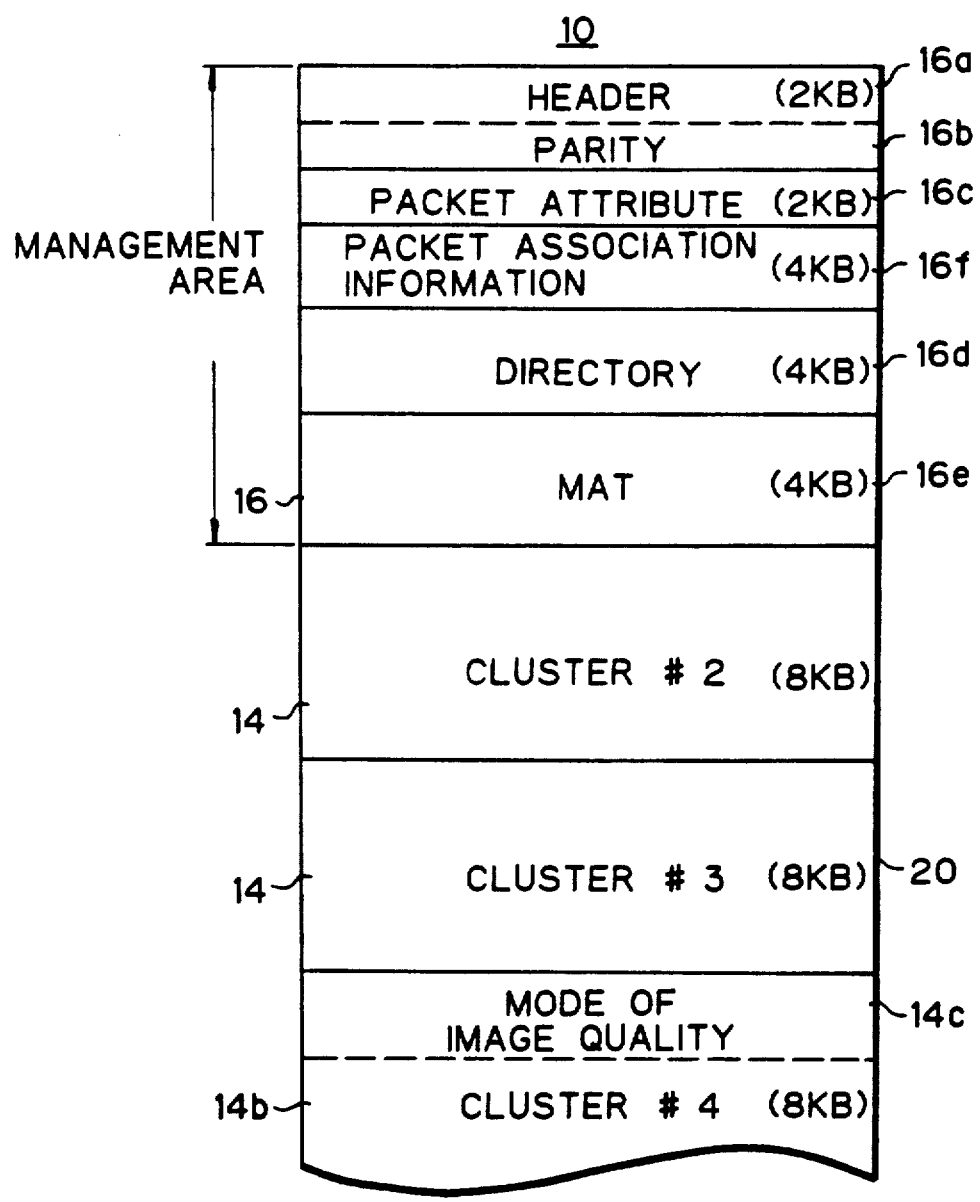
FIG. 8 is, similar to FIG. 2, a view showing an example of construction of storage areas of the memory card in another illustrative embodiment of the present invention.

FIG. 8 shows an example of another memory allocation of storage areas of the memory card 10 applied to an illustrative embodiment of the present invention. In this figure, the like parts are denoted by the same reference numbers as those of FIG. 2. According to this embodiment, each cluster comprises 8 k bytes, and there is provided area 16f for storing packet association information following storage area 16c for packet attribute. The cluster 14 is provided with 2048 areas from #0 to #2047. The aspects of the present embodiment reside in the points that numbering of not only cluster 14 but also packet 22 is provided beginning from #0, there is provided packet association information area 16f, and header 16a is provided with area 16a7, FIG. 9, for storing data representative of the number of frames subjected to photographing.

Figure 11:
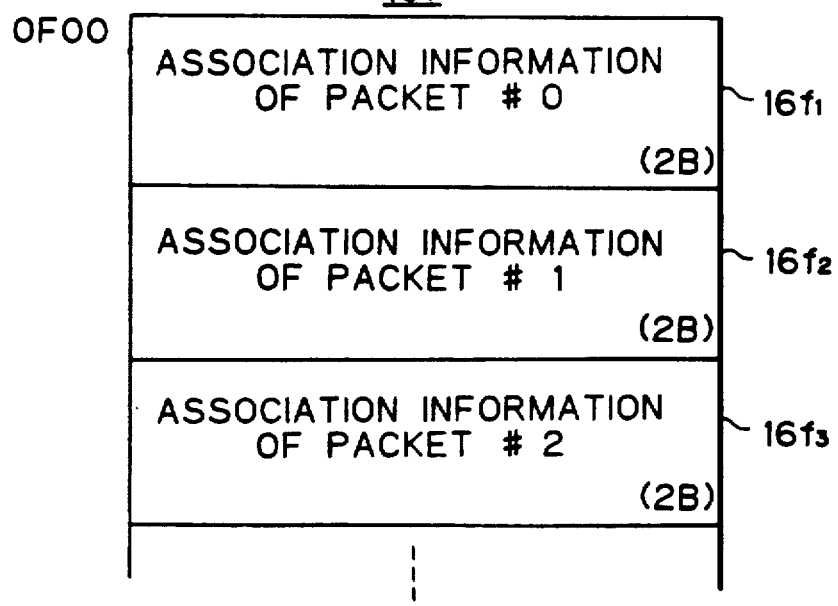
FIG. 11 is a view showing an example of construction of a packet association information area in the storage area layout shown in FIG. 9.

The packet 22 is able to store not only image data, but also the associated data other than the image data, such as audio data recorded involved in an image of other packet 22 and/or data generated by a personal computer, etc. The storage area 16f for the packet association information is divided, as exemplarily shown in FIG. 11, in accordance with the present embodiment, into 2048 blocks each comprising 2 bytes corresponding to packets #0–#2047, respectively, and occupies 4 k bytes of area. Those block areas store numbers of packets 22 in each of which the association data information involved in the associated packet 22 is stored, respectively. For example, stored in the storage area 16f3 for association information of packet #2 is, as the packet association information, number of packet 22 in which the association data information involved in the packet #2 is stored. In the storage area 16f, there is written, in accordance with the present embodiment, "$0000" into an area in which such a packet association information is not stored. Further, according to the present embodiment, packets #0 and #1 are used for the management area, and thus there are written symbol marks "$FFFF" in the associated packet association information areas 16f1 and 16f2, respectively.

FIGS. 14A and 14B show, when combined as shown in FIG. 14, an example of construction of a digital electronic still camera capable of recording the packet association information 16f. According to the present illustrative embodiment, camera 52 is provided with a microphone 200 which collects a sound or voice from the environment around the camera 52. An audio signal outputted from the microphone 200 is supplied to analog-to-digital converter 202 to be converted into the corresponding digital data. This data is temporarily stored in data buffer 204. The digital electronic still camera 52 is also provided with an input terminal 206 for digital data, which terminal permits entry of digital data generated by a processor such as a personal computer, into the camera 52. This digital data is temporarily stored in data buffer 208. Outputs of those buffers are connected to selector 64, similar to the data buffer 63.

When the audio data and computer data are entered to the camera 52, while the image data is written into the memory card 10, those data are temporarily stored in data buffers 204 and 208, respectively. The audio data stored in the buffers 204 and the digital data stored in data buffer 208 are selectively connected to the connector 50 under control of the system control 68. The system control 68 writes in clusters 14 of storage area 20 of the card 10, similar to writing of the image data aforementioned, the packet information data stored in data buffers 204 and 208 as packet 22.

At that time, the system control 68 generates number of the packet 22 formed with those packet association data to set the thus generated number to management data alteration circuit 72. The system control 68 controls the data selector 64 to connect the management data alteration circuit 72. Concurrently, the system control 68 generates an address of storage area 16f-i for the packet association information corresponding to a packet 22 for image data involved in those packet association data, and transmits the thus generated address together with a writing instruction to addressing circuit 76. A packet number associated with the packet association data is read out from the management data alteration circuit 72, and then is written into the storage area 16f-i corresponding to the image data in the packet association information area 16f.

Figure 9:
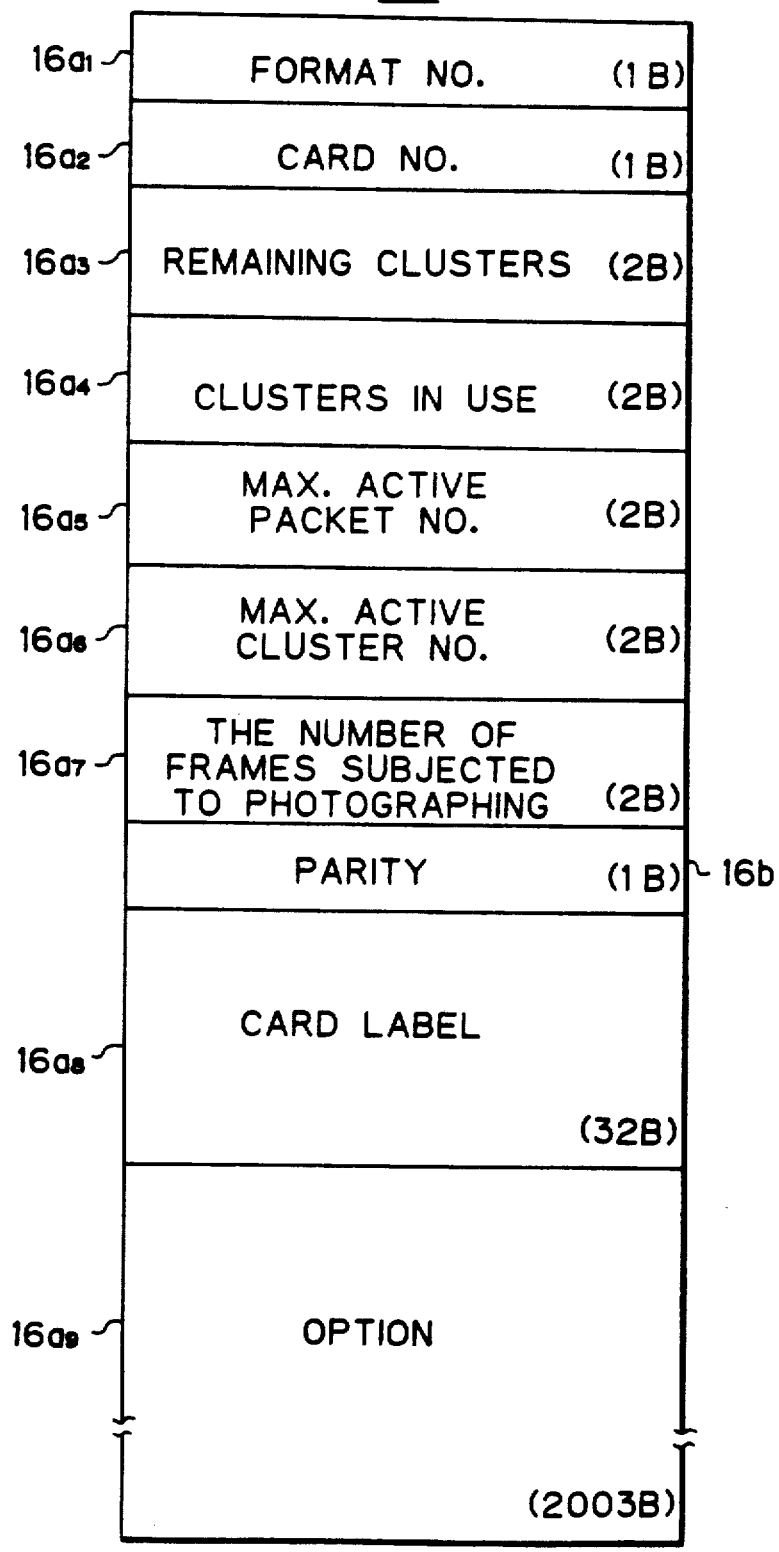
FIG. 9 is a view showing an example of an area layout of a header area in the construction of storage areas shown in FIG. 8.

Referring to FIG. 9, header 16a includes format number 16a1, card number 16a2, the number of remaining clusters 16a3, the number of occupied clusters 16a4, maximum active packet number 16a5, maximum active cluster number 16a6, and the number of frames subjected to photographing 16a7. Their occupation areas in capacity are exemplarily shown within parentheses ( ) in FIG. 9. According to the present embodiment, the area 16a for header 16a occupies 2048 bytes. The parity 16b is obtained by means of calculation of 12 bytes of data from format number 16a1 to the number of frames subjected to photographing 16a7 in a vertical direction. In area 16a8 (32 bytes), there is stored label of the memory card 10. The remaining 2003 bytes are of an option area.

The format number 16a1 of the header 16a indicates a format of the memory card 10. An area of card number 16a2 stores an identification number of the card 10. The number of remaining clusters 16a3 is, similar to explanation as made in conjunction with FIG. 2 before, representative of the number of clusters 14 which are available for writing of the image data on the storage area 20, that is, the number of empty clusters 14. The number of occupied clusters 16a4 is data representative of total numbers of the clusters 14 in which image data are effectively written in the storage area 20. The maximum active cluster number 16a6 is data representative of a cluster having the largest cluster number among the clusters 22 in which data are stored. The maximum active packet number 16a5 is data representative of a packet having the largest packet number among the packets 22 stored in the storage area 20.

The number of frames subjected to photographing 16a7, which is an aspect of the present embodiment, is data representative of the number of packets including image data among the packets 22 stored in the storage area 20. This corresponds to the number of frames including recorded images. The system control 68 calculates the number of frames subjected to photographing to be set to the management data alteration circuit 72, so that the thus obtained number is written into the area for the number of frames subjected to photographing 16a7 of the memory card 10. When the memory card 10, on which the number of frames subjected to photographing 16a7 is recorded, is set to the electronic still camera 52, management data read out circuit 74 reads out the number of frames subjected to photographing 16a7 together with other management data. Thus, the system control 68 may readily identify the number of frames subjected to photographing by means of simply searching for the header 16a based on the data from the management data read out circuit 74. According to the embodiment shown in FIG. 5, in order to know the number of frames subjected to photographing, the packet attribute area 16c is searched. According to the embodiment shown in FIG. 12, on the other hand, search of header 16a enables the number of frames subjected to photographing to be obtained, and thus it is possible to perform promptly retrieval or processing.

This is similar, also on the regenerative apparatus for the memory card 10.

Figure 12:
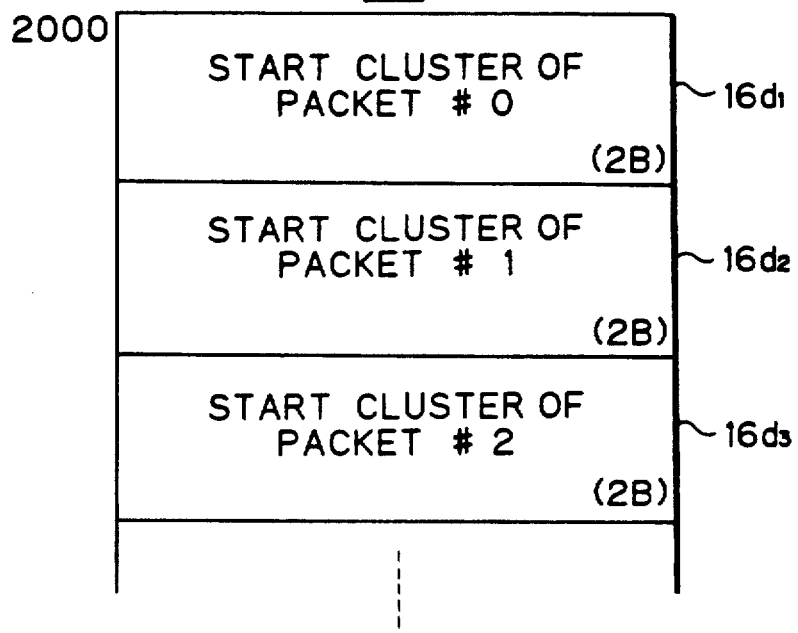
FIG. 12 is a view showing an example of construction of a start cluster area in the storage area layout shown in FIG. 9.

Further, an aspect of the present embodiment shown in FIG. 12 resides in the point that a packet number is provided beginning from #0. In this case, the management data of clusters #0 and #1 are treated as packets #0 and #1, respectively. According to the present embodiment, since such a numbering scheme is employed, it is possible to simplify conversion of packet numbers and addresses of storage areas 16 and 20 of the card 10.

Figure 10:
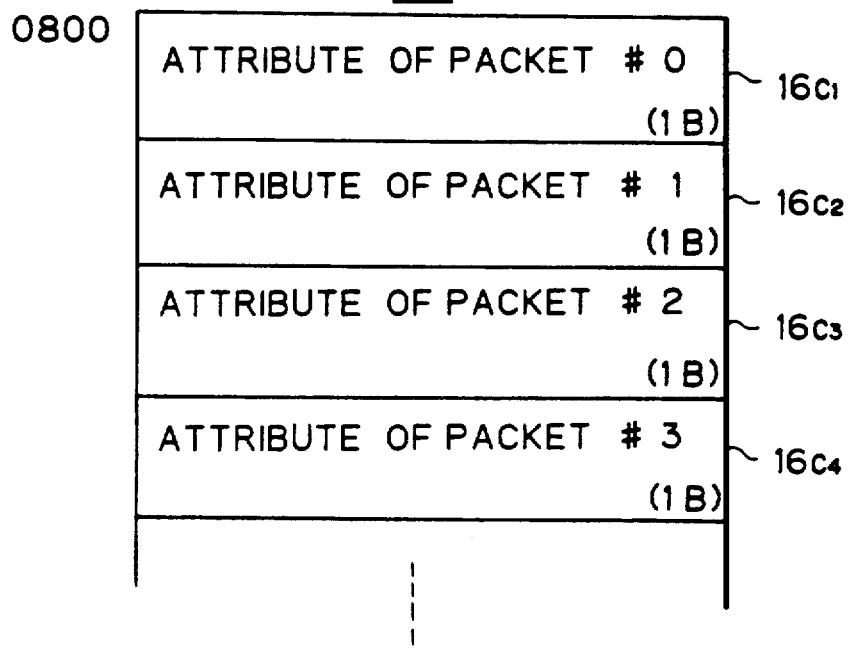
FIG. 10 is a view showing an example of construction of a packet attribute area in the storage area layout shown in FIG. 9.

For example, conversion of address for designating each individual packet attribute storage area 16c-i in packet attribute storage area 16c is performed in the following procedure. Since the header 16a occupies 2k bytes, there is provided, as shown in FIG. 10, "0800" for a first address of packet attribute area 16c. Each individual packet attribute storage area 16c-i occupies 1 byte. Therefore, a first address of individual packet attribute area 16c1 etc can be obtained simply by means of adding a packet number to "$0800". Thus, simplified is conversion from packet numbers in the system control 68 to addresses of storage areas 16 and 20 of the card 10. Regarding packets #0 and #1 for management data, fixed data "$FF" as attribute, that is, binary notation "all 1" has been written.

Referring to FIG. 12, the respective start cluster numbers for the associated packets 22, each given with 2 bytes, are stored in directory 16d. The directory 16d stores one beginning from the first of cluster #1, and thus the first address is given by "$2000". Accordingly, it is possible to obtain the first address of each individual start cluster number area 16d-i in such a way that number of the associated packet 22 is multiplied by two, that is, the same is shifted, on a binary notation basis, to left by one digit, and the first address "$2000" of the area 16d is added to the thus obtained value. Regarding packets #0 and #1 for management data, fixed data "$FFFF" as data of a start cluster has been written.

Figure 13:
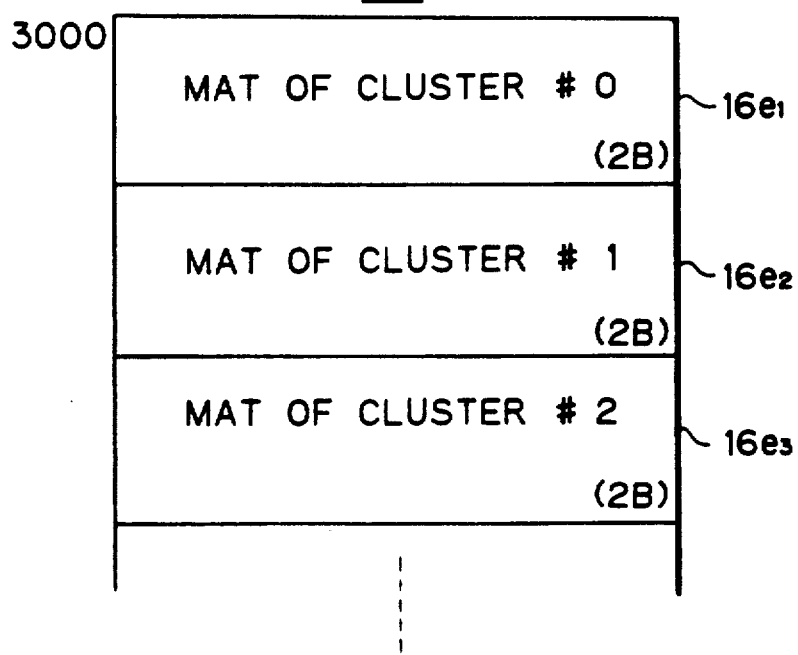
FIG. 13 is a view showing an example of construction of a MAT area in the storage area layout shown in FIG. 9.

It is similar, also on MAT area 16e. Referring to FIG. 13, the respective MATs for the associated clusters 14, each given with 2 bytes, are stored in MAT area 16e. The MAT area 16ed stores one beginning from the second half of cluster #1, and thus the first address is given by "$3000". Accordingly, it is possible to obtain the first address of each individual MAT area 16e-i in such a way that number of the associated cluster 14 is multiplied by two, that is, the same is shifted, on a binary notation basis, to left by one digit, and the first address "$3000" of the area 16e is added to the thus obtained value. Further, since an area of each individual cluster 14 occupies 8 k bytes, it is possible to obtain the first address of each individual cluster 14 in such a way that number of the associated cluster 14 is multiplied by 8000, that is, the same is shifted, on a binary notation basis, to left by 13 digits. This value is stored in the associated MAT area 16e-i. Regarding clusters #0 and #1 for management data, fixed value "$FFFF" has been written. As mentioned above, according to the present embodiment, since a packet number and a cluster number are provided begining from #0, it is possible to simplify address conversion of storage areas 16 and 20 of the memory card 10, thereby reducing more a time required for retrieval or processing in comparison with the embodiment shown in FIG. 2.

In the present invention stated above, when a memory card having data, such as image data, stored in every storage unit is used, the storage management is performed based on the management data stored in the card. Consequently, it is possible to access at random the content stored in the card, without increasing a system load, especially load to a storage apparatus. Further, according to the present invention, there is performed check of a logical matching to such a management data. This feature makes it possible to increase safety and reliability to a mishandling, such as pulling out the memory card from a recorder unit during the operations for example.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A storage management method for a memory card, having a storage area divided into a plurality of storage units that have a predetermined storage capacity, of managing storage of information in the plurality of storage units, comprising the steps of:

indicating by one of memory allocation tables a relationship of ones of the plurality of storage units in which a group of mutually associated information is to be stored in the form of a packet;

indicating by one of directories one of the plurality of storage units in which a beginning portion of said packet is to be stored; and storing in one of the plurality of storage units, as a header, management data representative of at least either one of the number of occupied ones of the plurality of storage units and the number of idle ones thereof, the header including an error check code for use in detecting an error of the management data.

2. A method according to claim 1, wherein said group of mutually associated information is subjected to a coded compression processing, the one of the plurality of storage units in which a beginning portion of said packet is to be stored includes information associated with a scheme of said coded compression, and logical matching between the information associated with a scheme of said coded compression and said management data is checked.

3. A storage management method for a memory card, having a storage area divided into a plurality of storage units that have a predetermined storage capacity, of managing storage of information in the plurality of storage units, comprising the steps of:

indicating by one of memory allocation tables a relationship of ones of the plurality of storage units in which a group of mutually associated information is to be stored in the form of a packet; and indicating by one of directories one of the plurality of storage units in which a beginning portion of said packet is to be stored, wherein at least one of said plurality of storage units is provided with a first storage area which stores packet attributable data including indication as to whether said packet is empty or occupied, and retrieval of said packet is performed referring to said first storage area, and wherein said group of mutually associated information provides a first packet including image data representative of a frame of image, at least one of audio data and digital data associated with said image data provides a second packet as another group of mutually associated information, and one of said plurality of storage units is provided with a second storage area which stores identification information specifying said second packet corresponding to said first packet, and said first and second packets are read out in association with each other referring to said second storage area.

4. A storage management method for a memory card, having a storage area divided into a plurality of storage units that have a predetermined storage capacity, of managing storage of information in the plurality of storage units, comprising the steps of:

indicating by one of memory allocation tables a relationship of ones of the plurality of storage units in which a group of mutually associated information is to be stored in the form of a packet;

indicating by one of directories one of the plurality of storage units in which a beginning portion of said packet is to be stored; and storing in one of the plurality of storage units, as a header, management data representative of at least either one of a packet number given by the largest number of one of the packets stored in the plurality of storage units and a packet number given by the smallest number of one of the empty packets, and a storage unit number given by the largest number of the plurality of storage units and a storage unit number given by the smallest number of one of the empty storage units.

5. Storing apparatus for storing information in a memory card having a storage area divided into a plurality of storage units that have a predetermined storage capacity, comprising:

card connector means for connecting said memory card to said apparatus;

management data forming means for forming management data including a memory allocation table indicating a relationship of ones of the plurality of storage units in which a group of mutually associated information is stored in the form of a packet, directory indicating ones of the plurality of storage units in which a beginning portion of the packet is stored, and either one of the number of ones of the plurality of storage units which are occupied and the number of ones of the plurality of storage units which are empty; and control means for controlling said management data forming means to store the group of mutually associated information, wherein said control means controls said management data forming means, after completion of storage of information into said memory card, so as to first form said memory allocation table and said directory, and then said management data to store those in one of the plurality of storage units.

* * * * *